United States Patent [19]

Nakatani et al.

[11] 4,433,906
[45] Feb. 28, 1984

[54] MICROFILM READER PRINTER EQUIPPED WITH IMPROVED EXPOSURE AMOUNT CONTROL ARRANGEMENT

[75] Inventors: Keiji Nakatani, Kawasaki; Shiro Toriumi, Zama, both of Japan

[73] Assignee: Minolta Camera Kabushiki Kaisha, Osaka, Japan

[21] Appl. No.: 300,284

[22] Filed: Sep. 8, 1981

[30] Foreign Application Priority Data

Sep. 26, 1980 [JP] Japan ............... 55-134838

[51] Int. Cl.³ .................................. G03B 27/52
[52] U.S. Cl. .......................... 355/55; 355/57; 355/68; 355/69
[58] Field of Search ............ 355/57, 43, 45, 55, 355/68, 69

[56] References Cited

U.S. PATENT DOCUMENTS

| | | |
|---|---|---|
| 2,937,569 | 5/1960 | Wilton . |
| 2,995,978 | 8/1961 | Glandon et al. ............ 355/68 |
| 3,472,586 | 10/1969 | Zuili . |
| 3,486,434 | 12/1969 | Suzuki et al. ............ 354/46 |
| 3,699,868 | 10/1972 | Shimomura ............ 354/46 |
| 3,732,011 | 5/1973 | Hansard ............ 355/69 |
| 3,746,446 | 7/1973 | Sliwkowski ............ 355/69 |
| 3,795,444 | 3/1974 | Glidden et al. ............ 355/69 |
| 3,977,778 | 8/1976 | Seko et al. . |
| 4,017,180 | 4/1977 | Yen et al. . |
| 4,029,956 | 6/1977 | Leibundgut et al. . |
| 4,153,364 | 5/1979 | Suzuki et al. ............ 355/68 |
| 4,172,657 | 10/1979 | Watanabe et al. . |
| 4,278,334 | 7/1981 | Maeda ............ 355/69 |

FOREIGN PATENT DOCUMENTS 54-24684  8/1979  Japan .

*Primary Examiner*—Monroe H. Hayes
*Attorney, Agent, or Firm*—Wenderoth, Lind & Ponack

[57] ABSTRACT

A microfilm reader printer which includes a photo detector provided in a light path from a light source to a projecting surface, a control arrangement for setting quantity of light on the projecting surface to a predetermined value in accordance with an output of the photo detector, and an arrangement for compensating an error between change in output of the photo detector and change in quantity of light on the projecting surface in response to changeover of the projection magnification, in accordance with the changed projection magnification. By the above arrangement, the quantity of light on the projecting surface is maintained at the predetermined constant value regardless of the changeover of the projection magnification.

14 Claims, 14 Drawing Figures

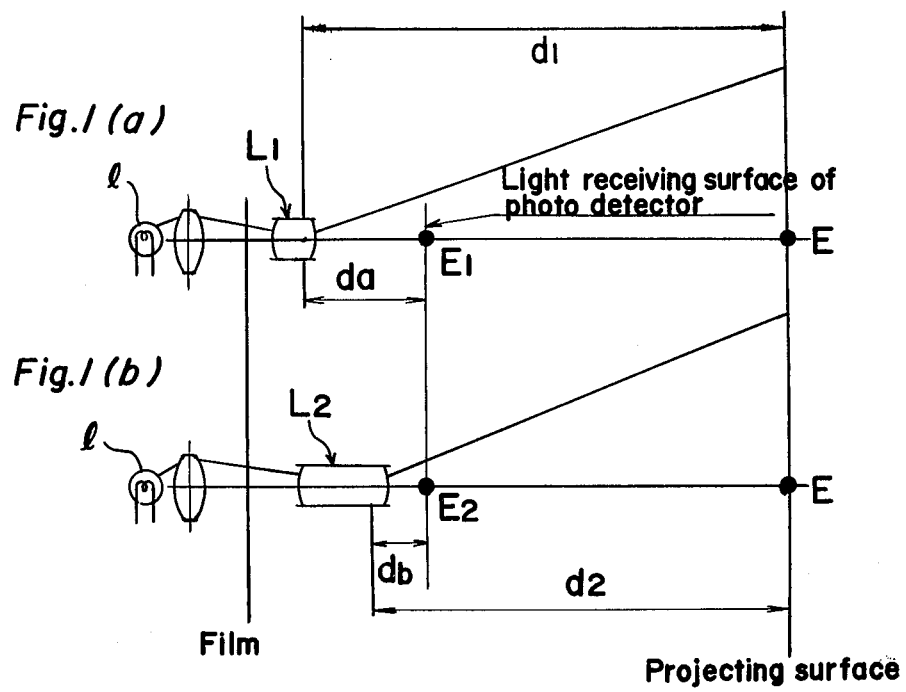
Fig.1 (a)
Fig.1 (b)
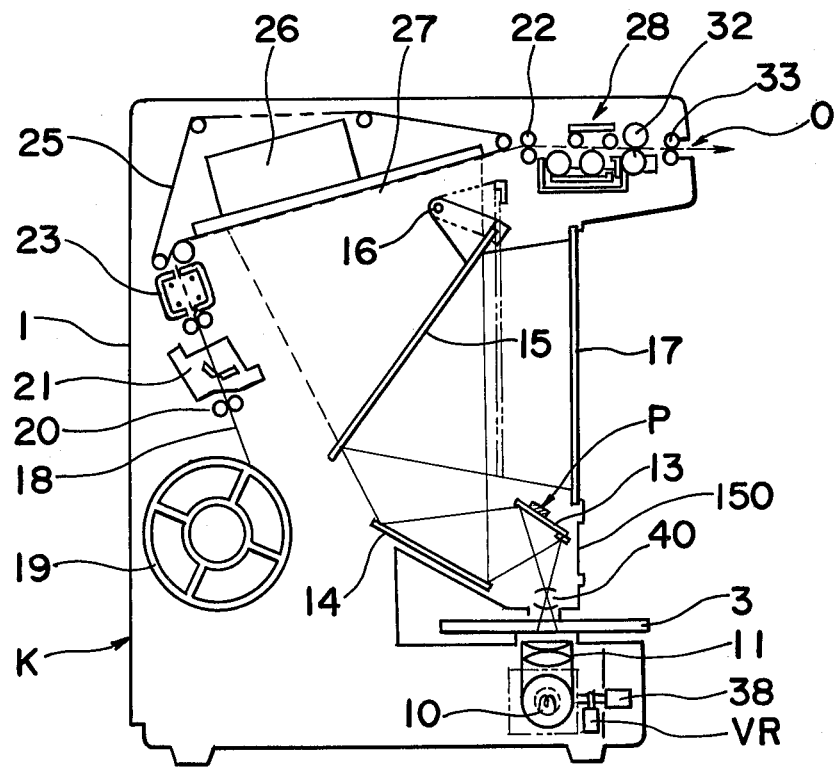
Fig.2

MICROFILM READER PRINTER EQUIPPED WITH IMPROVED EXPOSURE AMOUNT CONTROL ARRANGEMENT

BACKGROUND OF THE INVENTION

The present invention relates to a light amount control device provided within a copying apparatus and, more particularly, to an exposure amount control arrangement for use in a microfilm reader printer for controlling the amount of exposure on a projecting surface to a predetermined value in accordance with the output of the photo detector provided in the light path.

Generally, in microfilm reader printers, it is desirable that the amount of exposure in a process of exposure of images contained on a microfilm to light for producing projected images is controlled so as not to vary due to external factors such as variations in voltage, etc., except for the case where an operator changes the quantity of light for adjustment of density of images.

Meanwhile, since microfilms are standardized in various ways, they have different reduction ratios. Accordingly, in the case where images contained on such microfilms having various reduction ratios are projected for enlargement by a single reader printer, projection lenses having various magnifications corresponding to respective reduction ratios of the microfilms are interchangeably provided and thus, lenses are interchanged when microfilms having different reduction ratios are used.

Accordingly, since, in conventional reader printers, it has been so arranged that illuminance on a projected surface varies in response to changes in the magnification of lenses, the amount of exposure has been required to be controlled so that it will be maintained constant. Therefore, there have heretofore proposed or provided various methods or arrangements for automatic control of the amount of exposure in which photo detectors or photosensitive elements are provided on a projecting surface so that the amount of exposure may be controlled in accordance with the quantity of light received by the photo detectors.

However, the known arrangement as described above has such disadvantages that there are required not only a mechanism for retracting the photo detectors from the projecting surface at the time of exposure, but also a large number of photo detectors each having a large area for receiving light from enlarged, projected images.

In order to overcome the disadvantages as described above, there has also been proposed an arrangement in which a half mirror or the like provided in a light path directs light to a photo detector. But this arrangement, however, is also disadvantageous in that quantity of light received by the photo detector is not equal to that incident on the projecting surface. Namely, even if the illuminance of the light source is compensated at a predetermined rate corresponding to the lens being used so as to keep the amount of exposure on the projecting surface constant, the output of the photo detector has a different value, thereby posing a serious problem for automatic control of amount of exposure.

SUMMARY OF THE INVENTION

Accordingly, an essential object of the present invention is to provide an improved exposure amount control device for use in microfilm reader printers in which a photo detector is provided in a light path so as to compensate for an output error of the photo detector in response to a change in projection magnification so that the amount of exposure can be kept constant, with substantial elimination of the disadvantages inherent in conventional exposure amount control devices of this kind.

Another important object of the present invention is to provide an improved exposure amount control device as described above which has a simple structure, is highly reliable in actual use, and can be readily incorporated into reader printers and the like in general at low cost.

In accomplishing these and other objects according to one preferred embodiment of the present invention, there is provided an improved exposure amount control device which comprises a photo detector provided in a light path from a light source to a projecting surface, a control means for causing, in accordance with the output of the photo detector, quantity of light incident on the projecting surface to be a predetermined value, and means for compensating for an error between a change in output of the photo detector and a change in the quantity of light on the projecting surface in response to changeover of the projection magnification, in accordance with the changed projection magnification.

In accordance with the present invention, even if projection lenses are interchanged, the quantity of light incident on the projecting surface can be maintained at a predetermined constant value, and therefore, the exposure amount control device makes possible automatic control of amount of exposure and can be readily incorporated into reader printers and the like at low cost.

BRIEF DESCRIPTION OF THE DRAWINGS

These and other objects of features of the present invention will become apparent from the following description of a preferred embodiment thereof taken in conjunction with the accompanying drawings, in which:

FIGS. 1(a) and 1(b) are diagrams, showing the difference between the illuminance on a projecting surface and that on a light receiving surface of a photo detector, FIG. 2 is a schematic cross-sectional view of a microfilm reader printer for full frame exposure to which the exposure amount control device according to the present invention can be applied.

Before the description of the present invention proceeds, it is to be noted that like parts are designated by like reference numerals throughout several views of the accompanying drawings.

DETAILED DESCRIPTION OF THE INVENTION

Figure 3:
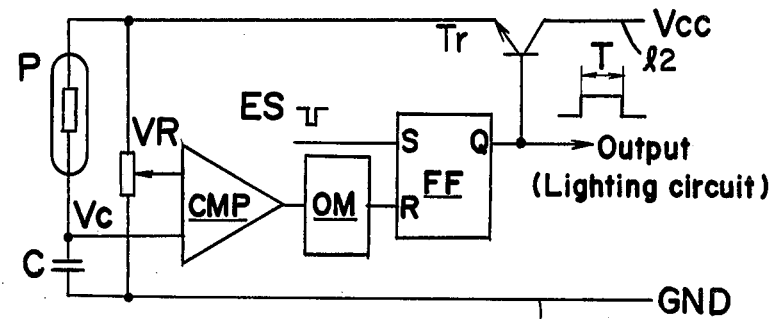
FIG. 3 is an electrical circuit diagram, showing an automatic control circuit for the exposure amount control device coupled with the reader printer of FIG. 2.

Referring now to the drawings, there is shown in FIGS. 1(a) and 1(b), two lenses L1 and L2 each having a different projection magnification through which light from a light source l is projected onto a projecting surface S at the illuminance E. A light receiving surface of a photo detector is provided between the lens L1 and the projecting surface S and between the lens L2 and the projecting surface S and positioned so as to be spaced distances $d_a$ and $d_b$ from the exit pupils of lenses L1 and L2, respectively. Meanwhile, the exit pupils of lenses L1 and L2 are spaced distances d1 and d2 from the projecting surface S, respectively.

When illuminances of light incident upon the light receiving surfaces of the respective photo detectors through lenses L1 and L2 are E1 and E2, respectively, the relation between E1 and E2 will be as described hereinbelow.

Assuming that the luminous intensities at the exit pupils of lenses L1 and L2 are I1 and I2, respectively, the illuminance E on the projecting surface is computed from the equation:

$$E = I1/d_1^2 = I2/d_2^2$$

Therefore, illuminances E1 and E2 on the light receiving surfaces of the photo detectors are respectively, given by:

$$E1 = \frac{I1}{d_a^2} = \frac{d_1^2}{d_a^2} E$$

$$E2 = \frac{I2}{d_b^2} = \frac{d_2^2}{d_b^2} E$$

Accordingly, equations above lead to the following equation:

$$\frac{E1}{E2} = \left( \frac{d_1 \cdot d_b}{d_a \cdot d_2} \right)^2 \quad (A)$$

Namely, as described above, when the projection magnification is changed over to another, change in illuminance on the projecting surface does not correspond linearly with that on the light receiving surface of the photo detector.

Accordingly, the exposure amount control device of the present invention is constructed so as to compensate for the output error of the photo detector corresponding to the illuminance error expressed by the equation (A) above so that amount of exposure on the projecting surface will be maintained constant.

More specifically, it is constructed not only to control exposure time or exposure illuminance, but to compensate the exposure time or exposure illuminance in accordance with changeover of the projection magnification.

Referring now to FIG. 2, there is shown a microfilm reader printer 1 for full frame exposure to which an exposure amount control device according to one preferred embodiment of the present invention can be applied. In the copying mechanism of the reader printer 1, copy paper 18 prepared by coating a photoconductive material on an electrically conductive base sheet is employed as a material to be exposed, and is kept stationary at an exposure station 27 for a predetermined exposure time.

The reader printer 1 generally includes a housing K having at its front wall an observation screen 17. At the left lower portion of the reader printer 1, there is rotatably provided a spool 19 on which the copy paper 18 is stored in roll form, while along the path of the copy paper 18 shown in a dotted line, are sequentially disposed a pair of paper feeding rollers 20, a cutter 21, a corona charger 23, a transport belt 25, a pair of transport rollers 22, a developing device 28, a pair of squeezing rollers 32, another pair of outlet rollers 33 and an outlet opening O.

Meanwhile, at the right lower portion of the reader printer 1, there is disposed a film carrier 3 on which microfilms (not shown) are held flat so as to be illuminated by a light source 10 immediately below the film carrier 3 so that light images contained in the microfilm are projected onto the exposure station 27 by a projecting lens 40 through reflecting mirrors 13 and 14 and onto the observation screen by lens 40 through reflecting mirrors 13, 14 and 15, respectively.

The copy paper 18 drawn off the spool 19 by the rotation of the paper feeding rollers 20 is subjected to uniform corona charging on the surface of the photoconductive material by the corona charger 23 and is cut to a predetermined size by the cutter 21 so as to be further fed to the exposure station 27 and stopped thereat by the suction of a suction means 26 exerted on the transport belt 25. While the copy paper 18 remains stationary at the exposure station 27 as described above, and with mirror 15 swung out of the way to the two dot chain line position, the light source 10 is energized for subjecting the copy paper 18 to exposure by the light images of the microfilm through the projecting lens 40 and reflecting mirrors 13 and 14 so as to produce electrostatic latent images on the copy paper 18. Then, the copy paper 18 thus exposed is further fed to the developing device 28 by the transport belt 25 and transport rollers 22 so as to be developed. After the development is completed, the copy paper 18 is fed through the squeezing rollers 32 and outlet rollers 33 and finally ejected out of the reader printer 1 through the outlet opening O at the upper front portion of the reader printer 1, whereby the copying is completed.

On the other hand, as shown in FIG. 2, the reflecting mirror 15 is disposed at the position shown in solid lines when the images are to be projected onto the screen 17. The reflecting miror 15 is pivotally retracted from the light path so as to be disposed at the position shown in two-dot chain lines when the images are projected onto the copy paper 18 at the exposure station 27 through the light path shown by the broken lines.

It is to be noted that the reflecting mirror 13 is a half-mirror and a photodetector P is provided on the rear side of the reflecting mirror 13.

Referring now to FIG. 3, there is shown an automatic control circuit for the exposure amount control device coupled with the reader printer of FIG. 2, including the photo detector P. The circuit is operative to automatically control exposure time T in accordance with the illuminance of light incident upon the photo detector P, and includes the photo detector P, a capacitor C, a variable resistor VR, a comparator CMP, a monostable multivibrator OM, a flip-flop FF, a transistor TR and a power source voltage Vcc. The photo detector P and capacitor C are connected in series between a lead line 11 and a lead line 12. The variable resistor VR is connected between the lines 11 and 12 parallel to the detector P and capacitor C to provide a reference voltage to one input of the comparator CMP. The other input of the comparator CMP is connected to the junction between the photo detector P and the capacitor C. The output of the comparator CMP is connected, through the monostable multivibrator OM, to one input R of the flip-flop FF. The emitter-collector circuit of the transistor TR forms one portion of the line 12. The photo detector P is connected, through the emitter-collector circuit of the transistor TR, to the power source voltage Vcc. The output Q of the flip-flop FF leads to a lighting circuit (not shown) and is also connected to the base of the transistor Tr.

When the copy paper 18 is transported by the actuation of a print switch (not shown) of the reader printer 1 and reaches the exposure station 27, an exposure signal ES is transmitted to the other input S of the flip-flop FF from a control circuit (not shown) for copying, so that the output Q of the flip-flop FF is set to the High level H and thus, the transistor TR is turned ON, whereby charging of the capacitor C is started through the photo detector P. When the charged voltage Vc of the capacitor C becomes larger than a divided voltage of the power source voltage Vcc outputted from the variable resistance VR, the output of the comparator CMP is set to the High level H, so that the monostable multivibrator OM is triggered and thus, the flip-flop FF is reset so as to turn OFF the lamp 10.

Then, since the internal resistance R of the photo detector P is caused to change in accordance with the illuminance on the light receiving surface of the photo detector P, the charging rate of the capacitor C is caused to change and thus, lighting time (exposure time) T is controlled, whereby the amount of exposure can be automatically or manually controlled by the use of the photo detector P by setting the variable resistor VR to a value corresponding to the lens being used with substantial elimination of the above-described disadvantages associated with interchange of lenses, etc.

This is brought about as follows. The resistance R of a photo conductive photo detector is expressed by the equation:

$$\log R = m \log E + l_N \quad \text{(B)}$$

where:
E = illuminance on the projecting surface,
m = constant determined by the photo detector, and
$l_N$ = value determined by exit pupil of a lens.

Figure 4:
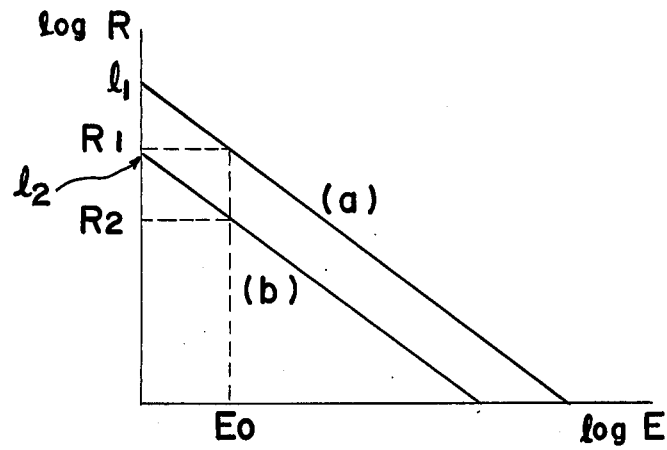
FIG. 4 is a graph explanatory of the relation between the illuminance on the projecting surface and the resistance value of the photo detector employed in the control device of FIG. 2.

Referring now to FIG. 4, there is shown a graph of two curves of the equation (B) for lenses L1 and L2 of FIGS. 1(a) and 1(b), respectively. R1 and R2 are the resistances of the photo detectors of FIGS. 1(a) and 1(b), respectively, when the illuminance on the projecting surface has a value Eo. The values l1 and l2 are determined by the exit pupils of the lenses L1 and L2, respectively.

On the other hand, in a CR timer composed of the photo detector P and capacitor C, the rise time T required for charging the capacitor C up to the voltage Vc is given by the equation:

$$T = -RCo\ln(1-\alpha) \quad \text{(C)}$$

where:
Co = capacity of the capacitor,
$\alpha = Vc/Vcc$, and
ln = natural logarithm.

When the illuminance on the projecting surface is Eo, the amount of exposure, Ex is given by:

$$Ex = Eo \cdot T \quad \text{(D)}$$

If the exposure time for lenses L1 and L2 is T1 and T2, respectively and Vc/Vcc for lenses L1 and L2 is $\alpha$1 and $\alpha$2, respectively, the following relation is obtained so as to provide a constant amount of exposure, Ex:

$$Eo \cdot T1 = Eo \cdot T2$$

$$\therefore T1 = T2$$

Accordingly, the equation (C) for the rise time T leads to the following equation:

$$R1\ln(1-\alpha1) = R2\ln(1-\alpha2) \quad \text{(E)}$$

$$\therefore \frac{\ln(1-\alpha1)}{\ln(1-\alpha2)} = \frac{R2}{R1}$$

Meanwhile, the equation (B) provides an equation as follows:

$$\frac{R2}{R1} = \frac{10^{(m\log Eo + l2)}}{10^{(m\log Eo + l1)}} \quad \text{(F)}$$

$$\therefore \log \frac{R2}{R1} = l2 - l1$$

$$\therefore \frac{R2}{R1} = 10^{(l2-l1)}$$

Thus, the equations (E) and (F) will be transformed as:

$$\frac{\ln(1-\alpha1)}{\ln(1-\alpha2)} = 10^{(l2-l1)} \quad \text{(G)}$$

As is clear from the foregoing description, when the value $\alpha$1 for a projecting lens having one magnification is obtained, the value $\alpha$2 for another projecting lens having a different magnification can be determined.

Accordingly, the output error of the photo detector P in response to interchange of projecting lenses can be compensated by setting the comparison voltage Vc by adjustment of the variable resistor VR.

More specifically, the output error can be compensated by manual setting by operating a dial or by automatic setting in response to interchange of lenses by associating a turrent holding the lenses being interchanged or a knob 38 for positioning a condenser lens 11 and corresponding by varying the variable resistor VR.

Generally, amount of exposure can be automatically controlled by two methods: (1) a value corresponding to the quantity of light received by a photo detector is stored preliminarily and then the amount of exposure is controlled at the time of exposure in accordance with the stored value and (2) the amount of exposure is controlled in accordance with the quantity of light received at the time of exposure by a photo detector.

According to the method (1), either the illuminance or exposure time or both can be controlled and compensation according to the present invention can be applied to either of them.

Meanwhile, since according to the method (2), illuminance cannot be controlled, the amount of exposure is controlled by controlling exposure time. Compensation according to the present invention is also performed with respect to the exposure time.

Namely, in the above-described reader printer 1, exposure time is controlled in accordance with quantity of light received at the time of exposure by the photo detector P while the output error of the photo detector P in response to interchange of lenses is compensated, whereby the exposure time is so controlled so as to makes the projection illuminance equal to a predetermined constant.

Accordingly, the arrangement above is based on the method (2).

Thus, by the arrangement shown in FIGS. 2, 3 and 4, exposure time is compensated automatically or manually when the reader printer acts as a printer.

Meanwhile, if a step of irradiating light from the lamp 10 onto the photo detector P prior to exposure is provided, for instance, the output of the photo detector P is stored when images are projected onto the screen 17, not only the exposure time but the illuminance can be controlled.

Control of the amount of exposure by automatic compensation of the quantity of light from a lamp by a modified exposure amount control device of the present invention will be described hereinbelow with reference to FIGS. 5 to 9(c).

Figure 5:
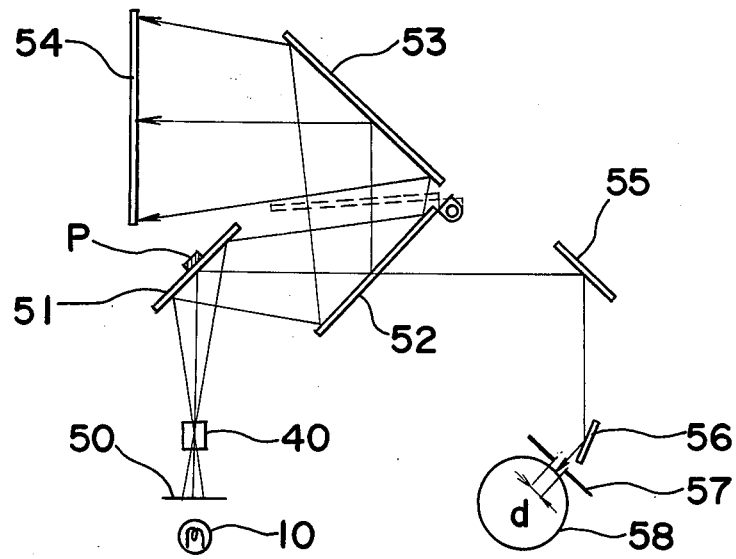
FIG. 5 is a schematic view of a light path of a microfilm reader printer for slit exposure to which a modified exposure amount control device according to the invention can be applied.

Referring now to FIG. 5, there is shown a light path of an optical system of a transfer type reader printer of the slit exposure type in which images contained on microfilm 50 are illuminated by a lamp 10 so as to be selectively projected onto a screen 54 through a lens 40, reflecting mirrors 51, 52 and 53 and also onto a photoreceptor drum 58 through the lens 40, reflecting mirrors 51, 55 and 56 and slit-defining plates 57 with the reflecting mirror 52 being retracted so as to be disposed at the position shown in broken lines.

When images are projected onto the photoreceptor drum 58, reflecting mirrors 55, 56, etc. are moved by a proper drive mechanism in accordance with the speed of movement of the surface of the photoreceptor drum 58 so as to be rotatably driven so as to scan images contained on the microfilm 50, or the microfilm 50 itself is moved at a rate corresponding to the projection magnification in synchronization with the rotation of the drum 58.

In such a scanning exposure mechanism, the reflecting mirror 51 is a half-mirror and the photo detector P is disposed at the rear side of the reflecting mirror 51.

Figure 6:
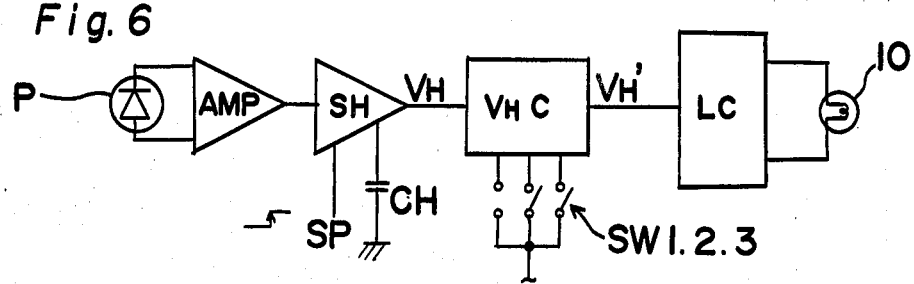
FIG. 6 is an electrical circuit diagram showing an automatic control circuit of the modified exposure amount control device coupled with the reader printer of FIG. 5.

Referring to FIG. 6, there is shown an electrical circuit for the modified exposure amount control device which can be used in the reader printer of FIG. 5, including a photo detector P, an amplifier AMP, a sample hold circuit SH, a $V_H$ compensating circuit $V_HC$ to be selectively connected to a lens interchange detection signal by switches SW1, SW2 and SW3, a lamp voltage control circuit LC and a lamp 10, all of which are sequentially connected in series.

The photo detector P is connected to the amplifier AMP and an output of the amplifier AMP leads to the sample hold circuit SH and a voltage corresponding to an output of the photo detector P at the time of input of a sampling pulse SP is stored in a capacitor CH. The sampling pulse SP is generated at least at the time of start of exposure when the reader printer acts as a printer and at least at the time of interchange of lenses when the reader printer acts as a reader. An output $V_H$ of the sample hold circuit SH is compensated in the $V_H$ compensating circuit $V_HC$ in response to a detection signal indicating positioning of an interchanged lens through any one of switches SW1, SW2 and SW3 to produce a compensated output voltage $V_H'$ corresponding to the lens which has been interchanged. The lamp voltage control circuit LC is arranged to provide a compensated constant voltage to the lamp 10. Thus the quantity of light of the lamp 10 based is detected by the photo detector P and is automatically compensated to provide the quantity of light from the lamp 10 in accordance with the lens which has been positioned in the exposure path as a result of the interchange of lenses desired.

An arrangement for detecting interchange of lenses will be described hereinbelow with reference to FIGS. 7, 8, 9(a), 9(b) and 9(c).

Figure 7:
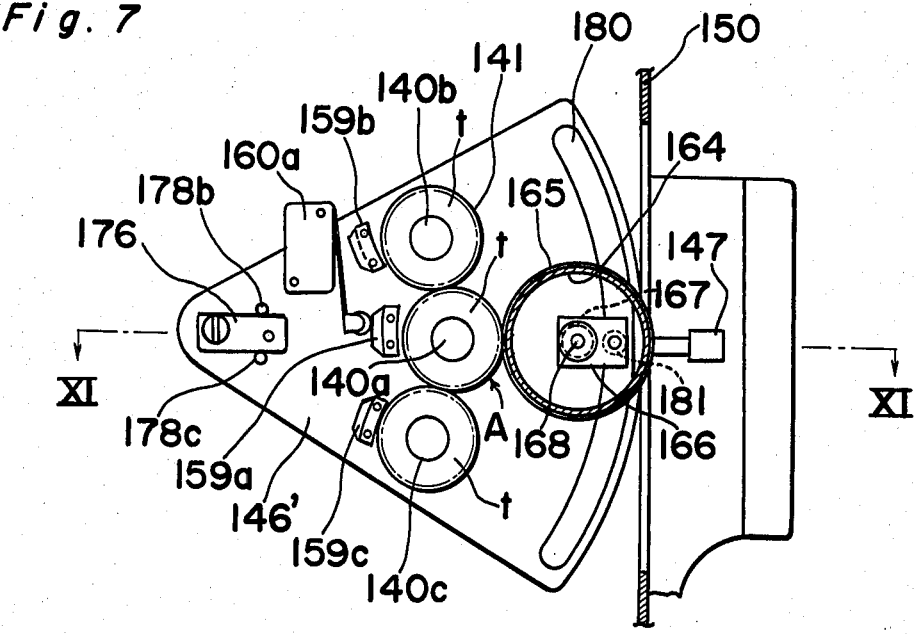
FIG. 7 is a top plan view, showing a lens interchange detection mechanism coupled with the control circuit of FIG. 6.
Figure 8:
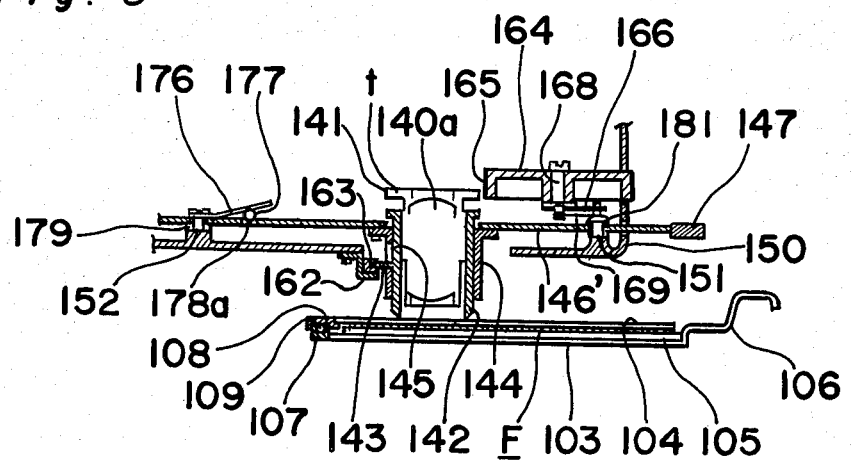
FIG. 8 is a cross-sectional view taken along the line XI—XI in FIG. 7.

Referring to FIGS. 7 and 8, there is shown an arrangement for detecting interchange of lenses in which projection lenses 140a, 140b and 140c each having a different projection magnification are mounted on a plate 146' spaced at predetermined intervals along the circumference of a circle having its center at a shaft 152 on which the plate 146' is pivotally mounted. Each of the projection lenses 140a, 140b and 140c is mounted in a lens mount t which is threadedly engaged with a barrel 142 for vertical movement, in FIG. 8, and has a toothed portion 141 at the upper periphery of the lens mount t, the barrel 142 being received in a barrel holder 144 secured to the change-over plate 146'. The change-over plate 146' is provided as supporting means for bringing the projection lenses 140a, 140b and 140c into a projection position A and is housed in a casing 150 provided in a U-shaped recessed portion formed between the film carrier 3 and the observation screen 17. The positioning of the projection lenses 140a to 140c is effected through selective elastic engagement of a click ball 177 pressed by a click spring plate 176 fixed to the shaft 152, with click recesses 178a, 178b and 178c formed in the change-over plate 146'.

Figure 9A:
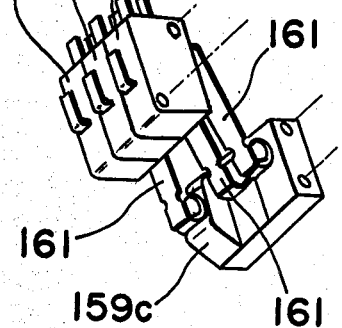
FIG. 9(a) is a perspective view, showing, on an enlarged scale, the construction of microswitches and a cam for actuating the microswitches as employed in the mechanism of FIG. 7, FIGS. 9(b) and 9(c) are perspective views, showing on an enlarged scale, the construction of cams for actuating the microswitches of FIG. 9(a)
Figure 9B:
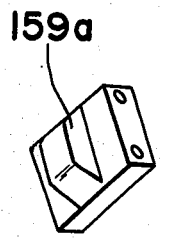
Figure 9C:
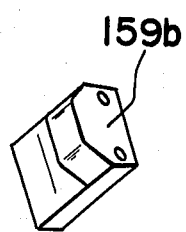

More specifically, the change-over plate 146' pivotally mounted, at the side remote from an operating knob 147, on the shaft 152 by a bearing 179, while at the other side of the plate 146', there is formed an arcuate guide opening 180 in which a guide roller 181 rotatably mounted on the shaft 151 is received, and upon lateral movement of the operating knob 147, the arcuate guide opening 180 is guided by the guide roller 181 to rotate the change-over plate 146' about the shaft 152 for the selective changing over of the projecting lenses 140a to 140c to the projecting position A. Also fixed on the change-over plate 146' at predetermined intervals are cams 159a, 159b, 159c of different heights which are adapted to operate corresponding actuators 161 of microswitches 160a, 160b and 160c disposed one above the other as shown in FIGS. 9(a), 9(b) and 9(c).

Accordingly, the microswitches 160a, 160b and 160c are arranged to be respectively actuated by the cams 159a, 159b and 159c for generating detection signals when the respective projection lenses 140a, 140b and 140c are at the projection position A.

For further details, reference should be made to U.S. Pat. No. 4,172,657 in which constructions of the arrangement for detecting the interchange of lenses are fully disclosed.

Thus, by the arrangement shown in FIGS. 5 to 9(c), the quantity of light from the lamp 10 is compensated automatically when the reader printer acts not only as a printer, but as a reader.

Now, control of the amount of exposure by manual compensation of exposure time (width of the slit) by a further modified control device of the present invention will be described hereinbelow with reference to FIGS. 5, 10 and 11.

Figure 10:
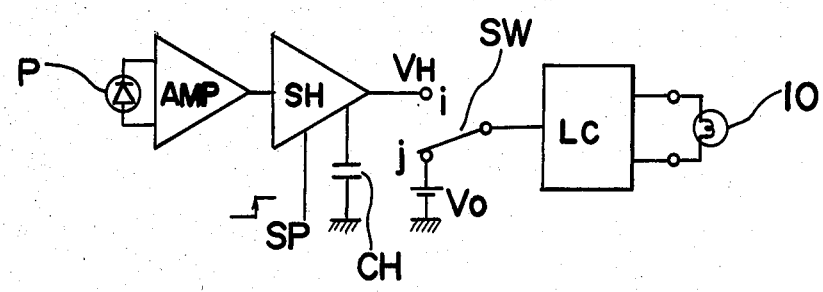
FIG. 10 is an electrical circuit similar to FIG. 6, showing a modification thereof.

Referring now to FIG. 10, there is shown an electrical circuit similar to FIG. 6, showing a modification thereof. The electrical circuit includes a photo detector P, an amplifier AMP, a sample hold circuit SH, a lamp voltage control circuit LC and a lamp 10, all of which are sequentially connected in series.

The photo detector P is connected to the amplifier AMP and the output of the amplifier AMP leads to the sample hold circuit SH and a voltage corresponding to the output of the photo detector P at the time of input of a sampling pulse SP is stored in a capacitor CH. A switch SW provided between the sample hold circuit SH and the lamp voltage control circuit LC is arranged to be changed over to a contact j when the reader printer acts as a reader and to a contact i at least at the time of exposure when the reader printer acts as a printer.

When the reader printer acts as a reader, that is, images are projected onto the screen 54, a constant voltage Vo is supplied to the lamp voltage control circuit LC. The constant voltage Vo serves as a reference voltage when the sampling pulse SP is generated. Namely, the quantity of light of the lamp 10 which is illuminated by the constant voltage Vo when the reader printer is acting as a reader is detected by the photo detector P and stored in the capacitor CH preliminarily. Then, when the reader, printer acts as a printer, that is, images are projected onto the photoreceptor drum 58, the output $V_H$ of the sample hold circuit SH is supplied to the lamp voltage control circuit.

Accordingly, the constant voltage Vo is applied to the lamp 10 when the reader printer acts as a reader. Meanwhile, when the reader printer acts as a printer, a voltage which is controlled in accordance with quantity of light received by the photo detector P is applied to the lamp 10, whereby illuminance on the exposure surface is so controlled as not to be caused to vary due to interchange of lenses, etc.

As described above, since the photo detector P is provided in the light path, an error between change in output of the photo detector P and change in illuminance on the exposure surface is required to be compensated. The compensation can be achieved not only by an arrangement in which a compensating voltage is supplied to the output $V_H$ of the sample hold circuit SH in response to interchange of lenses, as in the embodiment of FIGS. 6–9, but also by an adjustment of the slit by movement of the slit defining plates 57 as to change the width d of the slit so that exposure can be controlled, as shown in FIG. 11. Meanwhile, it is apparent that the equations described earlier can be applied to the compensating mechanism of FIG. 11.

Figure 11:
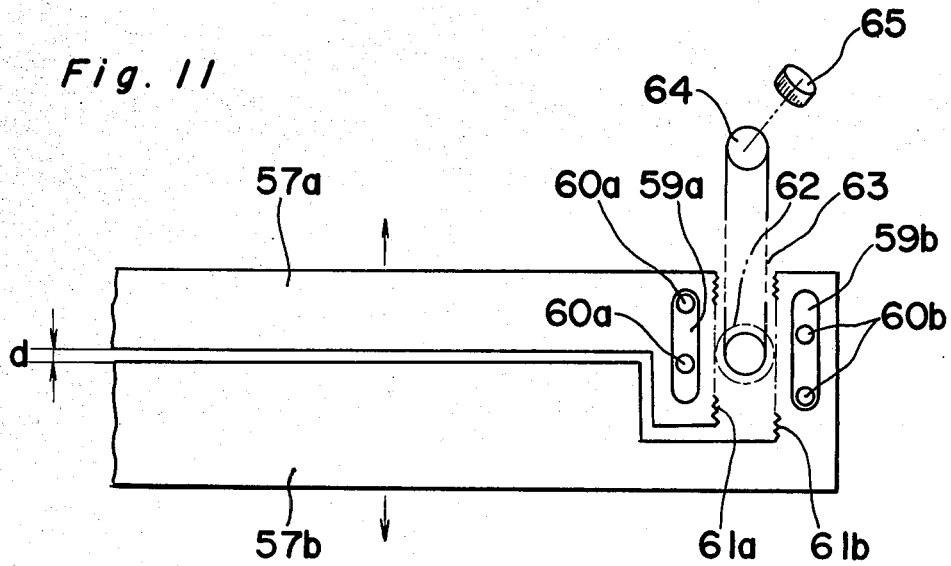
FIG. 11 is a front elevational view, showing, on an enlarged scale, a compensating mechanism coupled with the control circuit of FIG. 10.

As shown in FIG. 11, the compensating mechanism includes slit defining plates 57a and 57b which are so disposed as to be spaced a distance d from each other so that a slit of width d for exposure is formed. The slit defining plates 57a and 57b are provided with elongated openings 59a and 59b, respectively and mounted for movement parallel with the elongated openings 59a and 59b by pins 60a and 60b which are received in the elongated openings 59a and 59b, respectively and which are secured to a housing K' (not shown) of the reader printer.

Moreover, the slit plates 57a and 57b are, respectively, provided, on sides thereof parallel with the elongated openings 59a and 59b, with racks 61a and 61b in mesh with a pinion gear 62 secured to the housing K'. The pinion gear 62 is rotated, through a belt 63 and a pulley 64, by operating an operating knob 65 so as to adjust the width d of the slit. The operating knob 65 can be manually set to a position in accordance with the lens to be used by proper graduations or markings provided on the knob 65 but as described above, also can be associated with changeover of the magnification of the lens or positioning of the condenser lens.

Thus, by the arrangement shown in FIGS. 5, 10 and 11, exposure (width d of the slit) is compensated manually when the reader printer acts as a printer.

As is clear from the foregoing description, since the exposure amount control device of the present invention comprises a photo detector provided in a light path from a light source to a projecting surface, a control means for controlling the amount of exposure on the projecting surface in accordance with the output of the photo detector and a compensating means for compensating for the error between the change in output of the photo detector and the change in quantity of light on the projecting surface in response to changeover of the projection magnification, in accordance with the changed projection magnification, a constant amount of exposure can be obtained regardless of the interchange of lenses without offsetting the advantages of an arrangement in which a photo detector is provided in a light path so as to control the amount of exposure.

Accordingly, the exposure amount control device of the present invention is highly advantageous and reliable in actual use.

Although the present invention has been fully described by way of example with reference to the accompanying drawings, it is to be noted that various changes and modifications will be apparent to those skilled in the art. Therefore, unless other changes and modifications depart from the scope of the present invention, they should be construed as being included therein.

What is claimed is:
1. A microfilm reader printer comprising:
   a light source for illuminating images on a microfilm;
   a projecting surface;
   an optical system between said light source and said projecting surface including (a) at least one projecting lens for projecting images from the microfilm onto said projecting surface, (b) means for changing the projection magnification of the projected images without changing the distance between the microfilm and said projecting surface and being constituted by interchangeable lenses at a position along the optical axis of said optical system and which interchangeable lenses have different distances between the exit pupils thereof and the projecting surface, respectively, and (c) a condenser lens movable along the optical axis between said light source and said microfilm;

a photodetector provided in the light path from said light source to said projecting surface;

a control means connected between said photodetector and said light source for setting the quantity of light delivered onto the projecting surface at a value in accordance with the output of said photodetector by controlling the length of time of operation of said light source;

a position detecting means for detecting the position of said condenser lens which has been changed in accordance with the change-over of the projection magnification; and compensating means operatively associated with said control means and said position detecting means for compensating for the change in the quantity of light delivered onto the projecting surface after the changeover of the projection magnification by changing said time of operation in accordance with the changed projection magnification by compensating the output of said photodetector in accordance with the position detected by said position detecting means so as to adjust the length of time of operation of said light source for setting the quantity of light delivered to said projecting surface at a predetermined value, whereby the quantity of light on the projecting surface is maintained at said predetermined constant value regardless of the changeover of the projection magnification.

2. A microfilm reader printer as claimed in claim 1 wherein said control means includes a capacitor and an electric circuit, said capacitor being connected in series with said photodetector for being electrically charged at a rate corresponding to the quantity of light received by said photodetector;

said electric circuit being connected for electrically charging said capacitor simultaneously with the starting of operation of said light source, said compensating means being means for comparing a voltage charged in said capacitor with a reference voltage, and turning off said light source when said voltage charged in said capacitor exceeds said reference voltage; and said position detecting means is a variable resistor the resistance of which is varied according to the position of said condenser lens, and said compensating means being connected to said variable resistor for receiving the voltage from said variable resistor as the reference voltage.

3. A microfilm reader printer as claimed in claim 2 further including a viewing screen, and a pivotal mirror provided in front of the projecting surface and pivotally movable into and out of said light path for selectively directing the light path towards said screen, said photodetector being disposed in said light path between said one lens and said pivotal mirror.

4. A microfilm reader printer as claimed in claim 3 wherein said optical system includes a half mirror disposed between said one lens and said pivotal mirror, and said photodetector is on the rear side of said half mirror.

5. A microfilm reader printer as claimed in claim 2 wherein said projecting surface is made of photoconductive material and is stationary in a planar position, whereby all the images contained on the microfilm and illuminated by said light source in a single cycle of operation of said light source are subjected to exposure at the same time.

6. A micro film reader printer comprising:
a light source for illuminating images on a microfilm;
a projecting surface;
an optical system between said light source and said projecting surface including (a) at least one projecting lens for projecting images from the microfilm onto said projecting surface, (b) means for changing the projection magnification of the projected images without changing the distance between the microfilm and said projecting surface and being constituted by interchangeable lenses at a position along the optical axis of said optical system and which interchangeable lenses have different distances between the exit pupils thereof and the projecting surface, respectively, and (c) a condenser lens movable along the optical axis between said light source and said microfilm;

a photodetector provided in the light path from said light source to said projecting surface;

a control means connected between said photodetector and said light source for setting the quantity of light delivered onto the projecting surface at a value in accordance with the output of said photodetector by controlling the quantity of light from said light source;

a position detecting means for detecting the position of said condenser lens which has been changed in accordance with the changeover of the projection magnification; and compensating means operatively associated with said control means and said position detecting means for compensating for the change in the quantity of light delivered onto the projecting surface after the changeover of the projection magnification by changing said quantity in accordance with the changed projection magnification by compensating the output of said photodetector in accordance with the position detected by the position detecting means so as to adjust the intensity of light from said light source for setting the quantity of light delivered to said projecting surface at a predetermined value, whereby the quantity of light on the projecting surface is maintained at said predetermined constant value regardless of the changeover of the projection magnification.

7. A microfilm reader printer as claimed in claim 6 wherein said control means includes a sample hold circuit for holding a voltage corresponding to the output of said photodetector at a predetermined timing, said compensating means being means connected to said sample hold circuit for adjusting the output of said sample hold circuit in accordance with the changed projection magnification, and a control circuit connected to said compensating means for controlling, in accordance with an output of said compensating means, the voltage applied to said light source, said position detecting means being a variable resistor the resistance of which is varied according to the position of said condenser lens, and said compensating means being connected to said variable resistor for receiving the voltage from said variable resistor compensating the output of said sample hold circuit.

8. A microfilm reader printer as claimed in claim 7 further including a viewing screen, and a pivotal mirror provided in front of the projecting surface and pivotally movable into and out of said light path for selectively directing the light path towards said screen, said photodetector being disposed in said light path between said one lens and said pivotal mirror.

9. A microfilm reader printer as claimed in claim 8 wherein said optical system includes a half mirror disposed between said one lens and said pivotal mirror, and said photodetector is on the rear side of said half mirror.

10. A microfilm reader printer as claimed in claim 7 further comprising means for scanning the images contained on the microfilm and forming a slit-shaped image of the scanned portions of the images, and said projecting surface being a moving photoconductive surface in a drum-like shape, said scanning means projecting the slit-shaped images onto said moving photoconductive surface.

11. A microfilm reader printer comprising:
a light source for illuminating images on a microfilm;
a moving photoconductive surface;
an optical system between said light source and said moving photoconductive surface including (a) at least one lens for projecting images from the microfilm onto said moving photoconductive surface, (b) means for changing the projection magnification of the projected images without changing the distance between the microfilm and said moving photoconductive surface and being constituted by interchangeable lenses at a position along the optical axis of said optical system and which interchangeable lenses have different distances between the exit pupils thereof and the projecting surface, respectively (c) a condenser lens movable along the optical axis between said light source and said microfilm, and (d) a scanning means for scanning the images on the microfilm, forming a slit-shaped image of the scanned portions of the images, and projecting the slit-shaped images onto said moving photoconductive surface;
a photodetector provided in the light path from said light source to said moving photoconductive surface;
a control means connected between said photodetector and said light source for setting the quantity of light delivered onto the moving photoconductive surface at a predetermined value in accordance with the output of said photodetector;
a position detecting means for detecting the position of said condenser lens which has been changed in accordance with changeover the projection magnification; and
compensating means operatively associated with said scanning means and said position detecting means for compensating for the change in the quantity of light delivered onto the moving photoconductive surface after the changeover of the projection magnification by adjusting the width of the slit-shaped images formed by said scanning means in accordance with the position detected by said position detecting means so as to adjust the quantity of light from said light source for setting the quantity of light delivered to said projecting surface at a predetermined value, whereby the quantity of light on the projecting surface is maintained at said predetermined constant value regardless of the changeover of the projection magnification.

12. A microfilm reader printer as claimed in claim 11 wherein said control means includes a sample hold circuit for holding a voltage corresponding to the output of said photodetector at a predetermined timing, and a control circuit connected to said sample hold circuit for controlling, in accordance with the output of said sample hold circuit, the voltage applied to said light source.

13. A microfilm reader printer as claimed in claim 12 further including a viewing screen, and a pivotal mirror provided in front of the projecting surface and pivotally movable into and out of said light path for selectively directing the light path towards said screen, said photodetector being disposed in said light path between said one lens and said pivotal mirror.

14. A microfilm reader printer as claimed in claim 13 wherein said optical system includes a half mirror disposed between said one lens and said pivotal mirror, and said photodetector is on the rear side of said half mirror.

* * * * *